Oct. 9, 1962  V. M. HOVIS, JR  3,057,412
POWER-DRIVEN RECIPROCATING HOE
Filed April 8, 1960  2 Sheets-Sheet 1
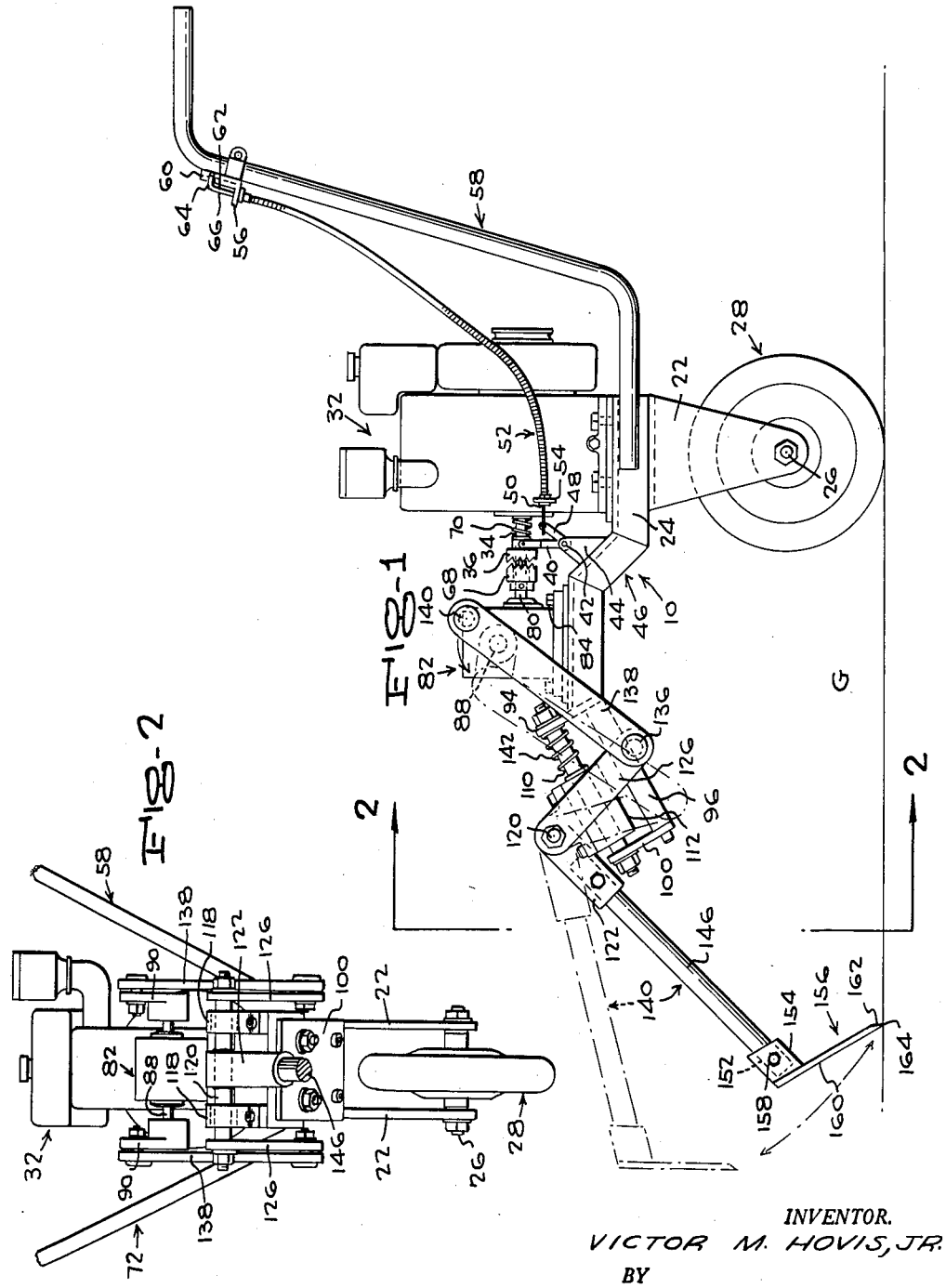
INVENTOR.
VICTOR M. HOVIS, JR.
BY
McMorrow, Berman & Davidson
ATTORNEYS

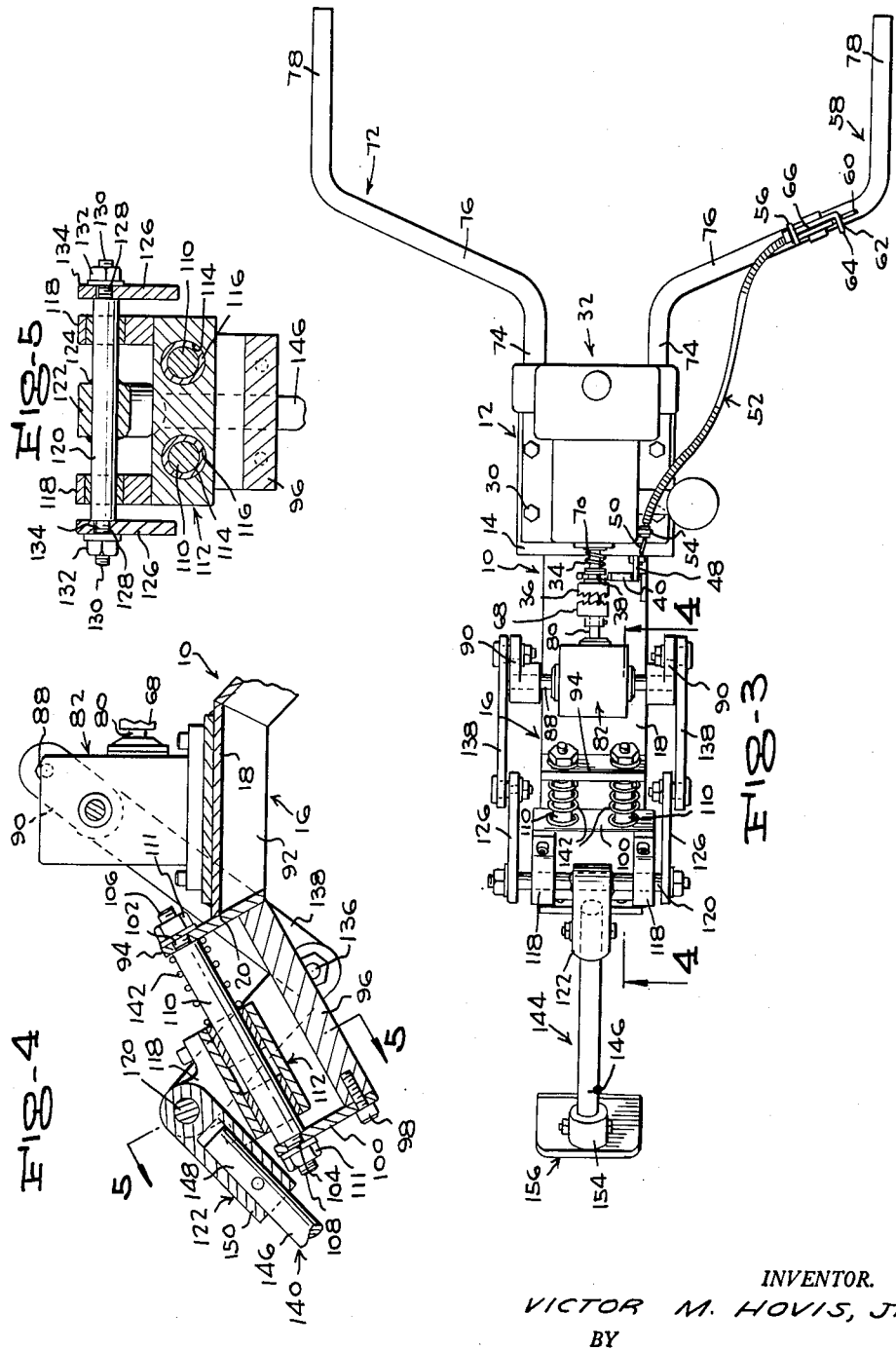

United States Patent Office 3,057,412
Patented Oct. 9, 1962

3,057,412
POWER-DRIVEN RECIPROCATING HOE
Victor M. Hovis, Jr., 110 King St., Kingston, Tenn.
Filed Apr. 8, 1960, Ser. No. 20,873
6 Claims. (Cl. 172—42)

This invention relates to a novel and improved power-driven reciprocating hoe.

The primary object of the invention is the provision of a more practical, efficient, and easily used device of the kind indicated, which has a hoe blade carrying arm which is pivotally and slidably mounted on the frame of the device so as to be swingable, from an elevated retracted position, in a downward and rearward motion, which simulates manual application of a hoe to the ground.

Another object of the invention is to provide a mechanically superior and rugged, single wheel, handle guided device of the character indicated above, wherein the shock and vibration otherwise imparted to the frame of the device by the reciprocation of the hoe and its arm, are cushioned by spring means acting between the hoe blade arm and the frame, the spring means also serving to aid and accelerate the downward and rearward movement of the hoe blade.

Other important objects and advantages features of the invention will be apparent from the following description and the accompanying drawings, wherein, for purposes of illustration only, a specific form of the invention is set forth in detail.

In the drawings:

FIGURE 1 is a side elevation of a device of the present invention, showing the hoe blade arm in depressed operative position in full lines, and in elevated retracted position in phantom lines;

FIGURE 2 is a vertical transverse section taken on the line 2—2 of FIGURE 1;

FIGURE 3 is a top plan view of FIGURE 1;

FIGURE 4 is an enlarged fragmentary vertical longitudinal section taken on the line 4—4 of FIGURE 3; and FIGURE 5 is a vertical transverse section taken on the line 5—5 of FIGURE 4.

Referring in detail to the drawings, wherein like numerals designate like parts throughout the several views, the illustrated device comprises a horizontal, longitudinally elongated, relatively narrow frame 10, preferably of inverted channel cross-section. The frame 10 has a depressed rear portion 12 having a flat web 14, and a kicked-up forward portion 16 having a flat web 18, the forward web 18 having a forward end 20. Laterally spaced, vertically elongated flat legs 22 are suitably fixed at their upper ends to the side flanges 24 of the web frame portion 12 and are traversed at their lower ends by an axle 26, on which is journalled a single suitable ground-engaging wheel 28.

Fixedly secured, as indicated, at 30, upon the rear web 14 is a prime mover, such as a gasoline engine 32, which has a forwardly extending splined drive shaft 34, on which is slidably splined a toothed, movable clutch member 36. The clutch member 36 has thereon a grooved clutch collar 38 with which is operatively engaged a clutch fork lever 40 which is pivotally mounted, as at 42, on an upstanding bracket 44 fixed on one side of the forwardly canted intermediate portion 46 of the frame 10. The clutch lever 40 is connected by a lever 48 to a flexible cable 50, which works through a flexible tube 52 which is fixed, as indicated at 54 and 56, to a side of the engine 32 and a guiding handle 58, respectively. A vertical detent plate 60 is fixed on the handle 58 and has a notch 62, in which a lateral terminal 64, on the upper end of a clutch releasing handle 66, is adapted to be engaged, to hold the movable clutch member 36 disengaged from a relatively stationary clutch member 68, against the resistance of a clutch engaging spring 70. The spring 70 is circumposed on the splined drive shaft 34, and is compressed between the movable clutch member 36 and a part of the engine 32.

The guide handle 58 is one of two similar and laterally divergent and upwardly and rearwardly extending guide handles, the other handle being designated 72. The handles have depressed horizontal forward portions 74 which are preferably fixed along the side flanges of the rear frame portion 12, upwardly and rearwardly angled, main intermediate portions 76, which are sharply angled laterally outwardly, as shown in FIGURE 3, and which terminate at their upper ends in rearwardly extending, parallel horizontal hand grip portions 78, the hand grip portions 78 being located at a height above the ground G, upon which the wheel 28 rolls, to be gripped by a user of the device.

The stationary toothed clutch member 68 is fixed on a driven shaft 80 which extends rearwardly from an enclosed reducing gear mechanism 82, which is fixedly mounted, as indicated at 84, upon the forward frame web 18. The reducing gear mechanism drives a transverse horizontal shaft 88 which has cranks 90 fixed on its opposite ends.

Fixed to the forward edge of the forward frame web 18 and the side flanges 92 of the forward frame portion 16, is an upstanding forwardly inclined transversely extending stop flange 94, to whose lower part is fixed the rear end of a forwardly declining heavy plate 96, to which forward end is abutted, and removably secured, as by means of screws 98, an upstanding forwardly inclined flange stop 100, which is parallel to the flange 94. The upper parts of the flanges 94 and 100 are provided with laterally spaced pairs of holes 102 and 104, respectively, which receive reduced studs 106 and 108, respectively, on related ends of round slide shafts 110. Nuts 111 are threaded on the studs and bear against the outer sides of the flanges 94 and 100 with the ends of the shafts 110 bearing against the facing sides of these flanges. By means of the foregoing arrangement, the slide shafts 110 are parallel spaced and decline forwardly at obtuse angles to the horizontal.

A solid transverse slide or yoke 112 has spaced bores 114 therethrough, which contain anti-friction bearings 116, which slidably secure the slide shafts 110, the yoke 112 being substantially narrower than the length of the shafts 110. Fixed on the ends of the yoke 112 are upstanding pillow-block bearings 118, through which a horizontal transverse rock shaft 120 is journalled, and a forwardly extending socket 122 is fixed, as indicated at 124, to the middle of the rock shaft 120, between and spaced from the bearings 118. Rearwardly and downwardly extending rock levers 126 have openings 128, in their upper ends, which are engaged on reduced threaded studs 130, on the ends of the rock shaft 120, on which they are retained by nuts 132, the levers 126 being keyed to the studs 130, as indicated at 134, in FIGURE 5.

Pivoted, as indicated at 136, to the lower ends of the rock levers 126, are the lower ends of rearwardly inclined connecting levers 138, which are eccentrically pivoted at their upper ends, as indicated at 140, to the free ends of the cranks 90, the connecting levers 138 being located outside of the rock levers 126, as shown in FIGURE 3. Helical expanding springs 142 are circumposed on the slide shafts 110 and are compressed between the slide or yoke 112 and the rear stop flange 94 on the forward end of the frame 10.

A hoe assembly 144 comprises a straight round arm 146 having a rear end 148 engaged in the socket 122, and suitably secured non-rotatably thereon, as by means of a removable cross bolt 150, and having a forward end 152 secured in a socket 154 fixed on an upper rear part of a hoe blade 156, by means of such as a cross bolt 158. The hoe blade 156 is preferably a flat, vertically elongated plate 160 which extends below the arm 144 and at right angles thereto and which is bevelled at its rear side along the lower edge, is indicated at 162, to provide a sharp cutting edge 164.

In operation, the engine 32 being in operation, the clutch being disengaged, the handles 58 and 72 being grasped to hold the device upright on its wheel 28, the clutch cable handle 66 is released from the notch 62 in the detent plate 60, so that the spring 70 drives the movable clutch member 36 forwardly into engagement with the stationary clutch member 68, so that the reducing gear mechanism shaft 88 and the cranks 90 are rotated. This produces, through the connecting levers 138, the rock levers 126, and the rock shaft 120, upward and downward swinging of the hoe assembly 144, on the axis of the rock shaft 120, accompanied by limited rearward sliding movement, lengthwise of the slide shafts 110, such that the hoe blade 160, as it approaches the ground G, has a downward and rearward combined motion as it enters the ground, which closely simulates normal manipulation of a hoe in the ground.

As the slide 112 moves rearwardly along the slide shafts 110, the springs 142 are progressively compressed and tensioned, so that the rearward travel of the slide is cushioned and its arrest, at the end of its rearward stroke, is cushioned, and the accompanying shocks absorbed, by the springs 142, and are not transmitted directly to the frame 10. Further, due to the tension of the springs 142, produced as described above, the springs serve, at the start of the forward stroke of the slide 112, to somewhat accelerate the forward stroke, initiated by the weight of the hoe assembly 144, and the actions of the cranks and levers. As the hoe blade 156 digs into the ground G, the up-kick of the hoe blade produced by this contact is not immediately and directly imposed upon the frame 10, but is partially absorbed by the springs 142.

With the device in operation as above described, a user of the device can produce a hard furrow or line, simply by holding the handles 58 and 72 and pushing the device forwardly or pulling the same rearwardly, with the frame 10 level or tilted, in order to obtain the desired depth of hoeing.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A power-driven hoe comprising a frame having forward and rear ends, ground-engaging wheel means on the frame spacing the frame upwardly from the ground, handle means fixed on the frame and extending rearwardly beyond the rear end of the frame, a normally forwardly declining hoe arm having upper and lower ends, a hoe plate fixed on the lower end of the hoe arm, slide shaft means fixedly mounted on said frame at the forward end of the frame, slide means slidably confined on said slide shaft means, means pivoting the hoe arm at its upper end on said slide, motor means mounted on said frame behind said slide shaft means, and crank and lever means operatively connecting the motor means to the hoe arm at its pivoted point for moving the hoe bar forwardly and rearwardly on the slide shaft means and vertically reciprocating the hoe arm on the axis of said pivot means, and spring means engaged between the frame and the slide means and urging the slide means forwardly on the slide shaft means.

2. A power-driven hoe comprising a frame having forward and rear ends, ground-engaging wheel means on the frame spacing the frame upwardly from the ground, handle means fixed on the frame and extending rearwardly beyond the rear end of the frame, a normally forwardly declining hoe arm having upper and lower ends, a hoe plate fixed on the lower end of the hoe arm, slide shaft means fixedly mounted on said frame at the forward end of the frame, slide means slidably confined on said slide shaft means, means pivoting the hoe arm at its upper end on said slide, motor means mounted on said frame behind said slide shaft means, and crank and lever means operatively connecting the motor means to the hoe arm at its pivoted point for moving the hoe bar forwardly and rearwardly on the slide shaft means and vertically reciprocating the hoe arm on the axis of said pivot means, and spring means engaged between the frame and the slide means and urging the slide means forwardly on the slide shaft means, said wheel means being a single centered ground-engaging wheel.

3. A power-driven hoe comprising a frame having forward and rear ends, ground-engaging wheel means on the frame spacing the frame upwardly from the ground, handle means fixed on the frame and extending rearwardly beyond the rear end of the frame, a normally forwardly declining hoe arm having upper and lower ends, a hoe plate fixed on the lower end of the hoe arm, slide shaft means fixedly mounted on said frame at the forward end of the frame, slide means slidably confined on said slide shaft means, means pivoting the hoe arm at its upper end on said slide, motor means mounted on said frame behind said slide shaft means, and crank and lever means operatively connecting the motor means to the hoe arm at its pivotal point for moving the hoe bar forwardly and rearwardly relative to the slide shaft means and vertically reciprocating the hoe arm on the axis of said pivot means, spring means compressed between a part on the frame and said slide means yieldably resisting rearward movement of the slide means on said slide shaft means and adapted to be compressed by such rearward movement, the compressed spring means serving to accelerate forward movement of the slide means on the slide shaft means and downward and rearward movement of the hoe arm, said pivot means comprising a pivot shaft to which the hoe arm is fixed, said crank and lever means comprising a rock lever fixed at one end to the pivot shaft, a connecting link pivoted at one end to the other end of the rock lever, a driven shaft mounted on the frame and having a crank arm to which the other end of the connecting link is pivoted.

4. A power-driven hoe comprising a wheeled frame having forward and rear ends, a pair of laterally spaced slide shafts fixed to and extending forwardly and downwardly relative to the frame at the forward end of the frame, front and rear stops on said slide shafts, a slide extending between and slidably mounted on said shafts, coil springs on the shafts and compressed between the rear stops and the slide, a rock shaft journalled on and extending beyond opposite sides of the slide, a forwardly declining hoe arm having a rear end fixed to said rock shaft at a location between said slide shafts and having a lateral hoe blade on its lower end, said coil springs serving to drive the hoe shaft downwardly and rearwardly relative to the ground and being adapted to be compressed as the hoe arm is elevated from a depressed ground-engaging position, levers having forward ends fixed on ends of said rock shaft and disposed at angles to the length of the hoe arms, said levers having rear ends, links having forward ends pivoted to the levers at their rear ends, and motor means mounted on the frame and having a transverse rotary shaft having ends having crank arms thereon, said links having rear ends pivoted to the crank arms.

5. A power-driven hoe comprising a wheeled frame having forward and rear ends, a pair of laterally spaced slide shafts fixed to and extending forwardly and downwardly relative to the frame at the forward end of the frame, front and rear stops on said slide shafts, a slide extending between and slidably mounted on said shafts, coil springs on the shafts and compressed between the rear stops and the slide, a rock shaft journalled on and extending beyond opposite sides of the slide, a forwardly declining hoe arm having a rear end fixed to said rock shaft at a location between said slide shafts and having a lateral hoe blade on its lower end, said coil springs serving to drive the hoe shaft downwardly and rearwardly relative to the ground and being adapted to be compressed as the hoe arm is elevated from a depressed ground-engaging position, levers having forward ends fixed on ends of said rock shaft and disposed at angles to the length of the hoe arms, said levers having rear ends, links having forward ends pivoted to the levers at their rear ends, and motor means mounted on the frame and having a transverse rotary shaft having ends having crank arms thereon, said links having rear ends pivoted to the crank arms, said rock shaft being on a level above the slide shafts, said levers declining rearwardly relative to the hoe arm and said links extending upwardly and rearwardly from the lower ends of the levers.

6. A power-driven hoe comprising a wheeled frame having forward and rear ends, a pair of laterally spaced slide shafts fixed to and extending forwardly and downwardly relative to the frame at the forward end of the frame, front and rear stops on said slide shafts, a slide extending between and slidably mounted on said shafts, coil springs on the shafts and compressed between the rear stops and the slide, a rock shaft journalled on and extending beyond opposite sides of the slide, a forwardly declining hoe arm having a rear end fixed to said rock shaft at a location between said slide shafts and having a lateral hoe blade on its lower end, said coil springs serving to drive the hoe shaft downwardly and rearwardly relative to the ground and being adapted to be compressed as the hoe arm is elevated from a depressed ground-engaging position, levers having forward ends fixed on ends of said rock shafts and disposed at angles to the length of the hoe arm, said levers having rear ends, links having forward ends pivoted to the levers at their rear ends, and motor means mounted on the frame and having a transverse rotary shaft having ends having crank arms thereon, said links having rear ends pivoted to the crank arms, said rock shaft being on a level above the slide shafts, said levers declining rearwardly relative to the hoe arm and said links extending upwardly and rearwardly from the lower ends of the levers, said rotary shaft being located on a level above the slide and the rock shaft.

References Cited in the file of this patent

UNITED STATES PATENTS

| | | |
|---|---|---|
| 947,638 | Hartsell | Jan. 25, 1910 |
| 1,869,961 | Glasier | Aug. 2, 1932 |
| 2,580,936 | Lytle | Jan. 1, 1952 |
| 2,597,107 | Kelsey | May 20, 1952 |
| 2,792,769 | Harshberger | May 21, 1957 |

FOREIGN PATENTS

| | | |
|---|---|---|
| 199,920 | Austria | Oct. 10, 1958 |